April 3, 1951  J. DEZZANI  2,547,199
ELECTRIC SIGNAL SWITCH
Filed Dec. 5, 1947
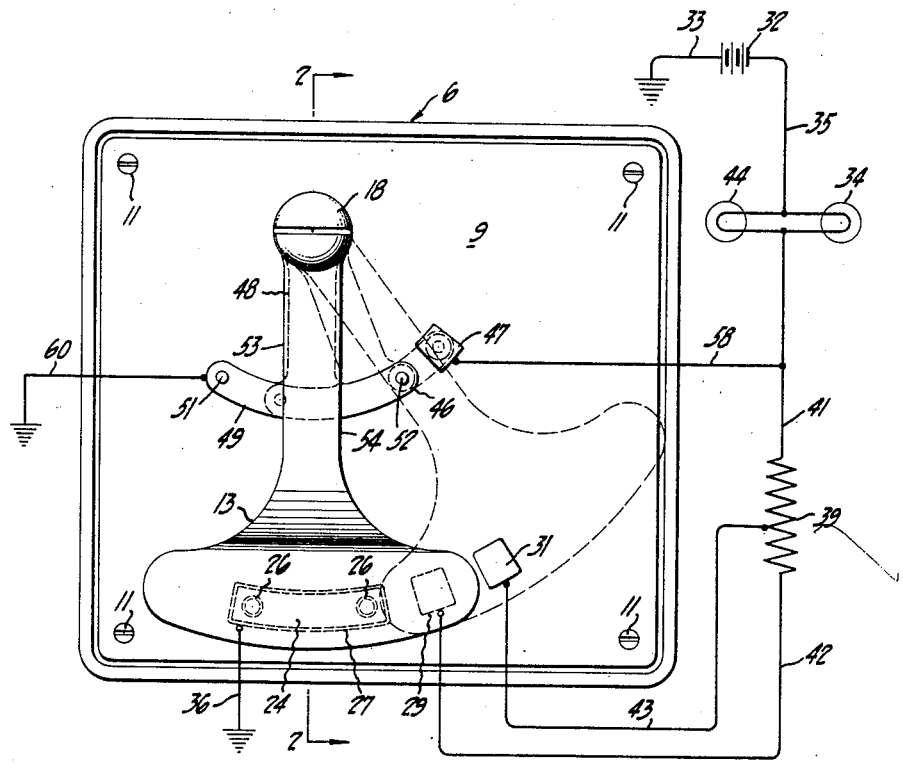
FIG_1_
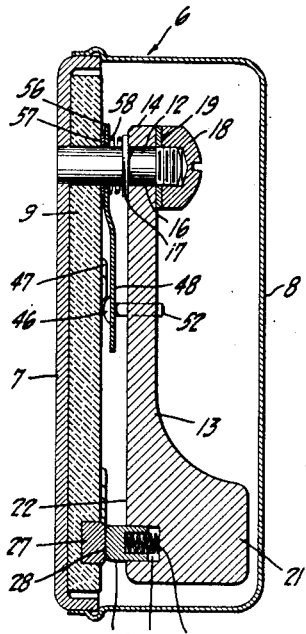
FIG_2_
INVENTOR.
John Dezzani
BY
Manfred M. Warren
his Atty

Patented Apr. 3, 1951

2,547,199

UNITED STATES PATENT OFFICE 2,547,199

ELECTRIC SIGNAL SWITCH

John Dezzani, Los Angeles, Calif., assignor to All-American Novelty Company, Inc., a corporation of California Application December 5, 1947, Serial No. 789,942

7 Claims. (Cl. 200—52)

The invention relates to electric switch mechanism of the type adapted for mounting on automotive vehicles and the like and use in indicator circuits designed to signal the drivers of following vehicles of a deceleration of the vehicle on which the mechanism is placed.

Various warning devices have been heretofore proposed and used on automotive vehicles to signal a deceleration of the vehicle. The principal device in this class is the customary stop light controlled by the braking apparatus of the vehicle and which functions to illuminate a light signal at the rear of the vehicle when the vehicle brakes are applied. As will be understood, there are various times and conditions in the driving of an automotive vehicle when substantial deceleration may take place without the use of the brakes, and in which cases the signal device controlled by the brakes is not put into operation. As is also understood, a vehicle which has been moving at a normal highway speed and slows up and perhaps even stops for a road impediment or for an unusually slow moving vehicle, remains a hazard for vehicles approaching at normal speeds from the rear until the decelerated vehicle again resumes and moves on at a normal rate of speed. An object of the present invention is to provide an electric switch mechanism of the character described which, when mounted on an automotive vehicle or the like, and connected in an appropriate electric circuit will automatically actuate a warning signal on deceleration of the vehicle wholly independent of the use of the vehicle brakes and will maintain such signal in operation until the cause or reason for the deceleration has passed, and the forward movement of the vehicle is again accelerated to resume a normal driving speed consistent with road and driving conditions.

Another object of the invention is to provide an electric switch mechanism and signalling apparatus of the character described which will provide signals of successively increasing intensity in response to successively increasing amounts of deceleration whereby the driver of a following vehicle is put on notice as soon as deceleration of the forward vehicle starts, and is more effectively warned if such rate of deceleration increases.

A further object of the invention is to provide an electric signal switch mechanism of the character above which, in addition to its functions as aforesaid, will provide an automatic backup light signal for the vehicle on which it is used.

A further object of the invention is to provide an electric signal switch of the character described which is composed of a minimum number of sturdily formed parts which are designed to afford and withstand repetitive operations over a long period of time so as to insure proper and positive operation of the warning device throughout the effective life of the switch apparatus.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a front elevation of an electric switch constructed in accordance with the present invention and shown with a cover plate of the switch removed to illustrate the operating parts. An electric signal circuit is diagrammatically included in Figure 1 to illustrate the electric functioning of the several parts.

Figure 2 is a cross sectional view of the switch illustrated in Figure 1 and is taken substantially on the plane of line 2—2 of Figure 1.

The electric switch illustrated in the accompanying drawing is desirably encased in a housing of switch box 6 having a rear supporting plate 7 and a detachable front cover 8. The various electrical parts of the switch are preferably mounted on an insulation block 9 which is here fastened to the back plate 7 of the housing as by means of screws 11. Mounted within the housing as by means of a stud pin 12, is a pendulum 13 which is journalled on the pin 12 and depends therefrom so as to swing to opposite sides of its rest position—its vertical position as seen in Figure 1—in response to an acceleration or deceleration of the mechanism, the amplitude of movement of the pendulum being a function of the rate of change of the velocity of the movement. As shown in Figure 2, the pin 12 is secured to the backing plate 7 generally perpendicular thereto and desirably the backing plate 7 is appropriately secured to a vehicle or the like so that the plane of the plate 7, and accordingly the plane of oscillation of the pendulum, is parallel to the normal direction of movement of the vehicle. Preferably, and as here shown, the upper end 14 of the pendulum is provided with a mounting opening 16 for the pin 12 and is held against a backing flange or shoulder 17 on the pin by means of a locknut 18 and antifriction washer 19, the mounting being such as to provide a relatively free oscillation of the pendulum. As will be seen from Figures 1 and 2, the pendulum is weighted at its base 21 as by increasing its cross-sectional area to provide a desired amount of movement of the pendulum in response to the rates of acceleration and deceleration encountered in the normal driving of an automotive vehicle.

Provided in the inner face 22 of the pendulum adjacent the base thereof is a socket or recess 23 adapted to receive a brush type contact member 24, the latter being preferably urged out of the recess 23 in the direction of the insulation plate 9 by means of one or more springs 26 carried by the contact 24 and compressed against the base of the recess. The contact 24 may be of any suitable material to withstand a repetitive wiping type action over a long period of time, and I have found that a carbon block is excellent for this purpose, although as will be understood, various other materials and constructions may be used. In the rest or vertical position of the pendulum 13, the contact 24 is positioned against a ground contact member 27 fixed to the insulation plate 9 so as to position the outer face 28 of the contact 24 in substantially the plane of another contact 29 positioned on the insulation member 9 in arcuately spaced relation to the rest position of contact 24. In this manner the face 28 of the contact 24 will be properly positioned to engage the face of contact 29 and to thereby bridge contacts 27 and 29 upon displacement of the pendulum, to the right as viewed in Figure 1, in response to a predetermined amount of deceleration. Desirably the spacing of the contact 29 from the contact 27 is normally quite small so as to cause a bridging of contacts 27 and 29 upon a relatively small amount of deceleration of the vehicle. Spaced arcuately a further distance from the rest position of the pendulum is another switch contact 31 mounted on the insulation backing member 9 and positioned to engage the contact 24 upon arcuate displacement of the pendulum 13 by a greater distance corresponding to a greater amount of deceleration. Thus, upon deceleration of the vehicle by a first and relatively small predetermined amount, electrical connection will be effected between contacts 27 and 29, and upon further and greater deceleration of the vehicle, and consequent further displacement of pendulum 13, electrical connection will be established between contacts 27 and 31.

The electric circuit for connecting the various contacts above described, and as illustrated in Figure 1, includes a source 32 of electrical potential such as the storage battery of the vehicle. One side of the battery is here shown grounded in the usual fashion as to the vehicle frame by means of conductor 33. The opposite side of the battery is connected by conductor 35 to one side of a signal lamp 34, the other side of which is appropriately connected to contacts 29 and 31, contact 27 being grounded as here indicated by conductor 36 to complete the electric circuit thereby energizing lamp 34 upon an engagement of contact 24 with either of contacts 29 or 31. Preferably, and as here shown, a tapped resistor 39 is connected between the contacts 29 and 31 and the signal lamp 34 so as to provide a differential in current flow occasioned by the engagement of contact 24 with contacts 29 and 31. As here shown, one end of resistor 39 is connected by conductor 41 to the signal lamp 34 and the other end of the resistor is connected by conductor 42 to contact 29 so that the full value of resistor 39 is inserted in the circuit upon engagement of contact 24 with contact 29. Contact 31 is connected by conductor 43 to a midpoint of resistor 39 so that a smaller amount of resistance is inserted in the circuit upon engagement of contact 24 with contact 31. Of course, instead of using a tapped resistor, a pair of resistors might be used. Electrical connection to the various contacts may be effected in any suitable manner as by means of wires leading therefrom to a suitable terminal strip (not shown). The lamp 34, as will be understood, may be any suitable type of signaling device such as a caution light positioned at the rear of the vehicle, or the device may constitute a horn, or the like. Preferably, a pilot light 44 is connected and parallel to the signal device 34 and is mounted within the driver's compartment of the vehicle as on the dash board, so as to indicate the proper operation of the signal device 34.

As an important feature of the present invention, and as above noted, means is provided for retaining the signal device 34 in operation after a predetermined amount of deceleration until the road hazard has been removed and the vehicle again moved forward at a normal rate of speed. To effect this purpose, a second set of electric contacts 46 and 47 is provided and which are actuated to closed position by means of a lost motion connection to the pendulum whereby the contacts will be closed upon a predetermined displacement of the pendulum and will remain in closed position for that degree of movement of the pendulum back to its rest position, the loss motion connection again picking up the pendulum movement to open the contacts 46 and 47 upon displacement of the pendulum to the opposite side of its rest position in response to acceleration of the vehicle. With reference to the drawing, it will be noted that there is mounted on the pin 12 coaxially with the pendulum, a depending lever arm 48 which is formed at its free base end with a cross arm 49 provided adjacent its opposite ends with outstanding pins 51 and 52 which straddle the sides 53 and 54 of the pendulum in predetermined spaced relation. The aforementioned contact 46 is appropriately provided on one end of the cross arm 49 and the contact 47 is supported on the insulation member 9 in arcuately spaced relation thereto, the arcuate distance of the contact 47 from the vertical rest position of the pendulum being somewhat greater than that of contacts 29 and 31. In the present construction, the contact 46 is conveniently provided by means of the head end of the outstanding pin 52. With reference to Figure 1, it will be seen that upon movement of the pendulum to the right as viewed in the figure, the side 54 of the pendulum will pick up the pin 52 to carry the arm segment 49 along with the pendulum, and if the pendulum movement is sufficiently great, the head contact end 46 of pin 52 will be brought into engagement with contact 47. The spacing of the various parts is such as above explained, as to bring about the closing of contacts 46 and 47 only after the closing of contacts 24 and 31, that is, upon the occurrence of an amount of deceleration greater than that required to close contacts 24 and 31. After the section 49 has been displaced, as above described to close contacts 46 and 47, a return movement of the pendulum will merely remove the side 54 of the pendulum from the pin 52, thereby leaving the arm segment 49 in its displaced position with the contacts 46 and 47 in engagement. As will be seen from Figure 2, the arm 48 is mounted on the pin 12 independently of the pendulum so as to move free with regard to the pendulum. As here shown, the upper end 56 of the arm is apertured to fit over the pin 12 and is held against a backing washer 57 on the insulation plate 9 by means of a spring 58 compressed between the upper end arm 56 and the pin shoulder 17.

The spacing between pins 51 and 52 on the arm segment 49 is preferably such as to permit a return of the pendulum to its rest position without disengaging contacts 46 and 47 after the pendulum has once swung sufficiently far on deceleration to close these contacts. This position of the several parts is illustrated by dotted lines in Figure 1 wherein it will be seen that pin 51 is positioned in substantial abutment with side 53 of the pendulum in its rest position. Thus, after the highway hazard has been removed or passed, and the vehicle is accelerated to resume normal driving speed, the pendulum 13 on such acceleration will be swung to the left, as viewed in Figure 1, thereby picking up in its movement pin 51 and carrying with it the arm segment 49 and consequently disengaging contacts 46 and 47. In the circuit diagram as here illustrated, contact 46 is grounded by conductor 60 and contact 47 is connected by conductor 58 to the signal lamp 34 ahead of the resistor 39 so that on closing of contacts 46 and 47 the full electrical potential of the battery is applied to the signal lamp 34.

In accordance with the foregoing, an initial amount of deceleration of the vehicle will cause an initial displacement of the pendulum so as to engage contacts 24 and 29 thereby actuating the signal device 34 at its weakest intensity. If deceleration continues at a greater and more dangerous rate, the pendulum will swing further so as to engage contact 24 with contact 31, thereby increasing the intensity of actuation of signal 34. A further and more critically dangerous rate of deceleration such as bringing the vehicle abruptly to a stop, or very slow pace, will cause the pendulum to swing still further, thereby closing contacts 46 and 47 to provide a full power energization of the signal 34. After such a deceleration as last described, the signal 34 is retained in operation until the vehicle again moves ahead at an accelerated pace, thereby indicating to the drivers of approaching cars that the critical road impediment or danger has passed.

I claim:

1. A vehicle stop signal switch mechanism comprising, a change in velocity responsive means having a normal position of rest and movable in opposite directions therefrom when subjected to acceleration and deceleration of movement and to be mounted on a vehicle with the plane of movement of said means parallel to the direction of movement of the vehicle, a pair of contacts actuated to closed position by said means upon movement of the latter in response to deceleration, means maintaining said contacts in closed position upon return of said first means to rest position, and means opening said contacts upon reverse movement of said first means responsive to acceleration.

2. In a vehicle stop signal an electric switch mechanism adapted for mounting on a vehicle subject to acceleration and deceleration and provided with a pair of electric contacts movable into and out of electric circuit opening and closing positions, actuating means for said contacts mounted for reciprocal movement in a direction parallel to the direction of movement of the vehicle and responsive to change in velocity to move on deceleration from a normal position of rest to a position closing said contacts, means maintaining said contacts in closed position upon return of said first means to its rest position and effecting an opening of said contacts upon acceleration.

3. A vehicle stop signal device comprising, an electric switch mechanism adapted for mounting on a movable vehicle subject to acceleration and deceleration and provided with a pair of electric contacts movable into and out of electric circuit opening and closing positions, a pendulum mounted to swing in a plane parallel to the direction of movement of said vehicle and operatively connected to said contacts and having a position of rest wherein said contacts are normally in open position and being displaced on deceleration from its rest position to a position closing said contacts, means maintaining said contacts in closed position upon return of said pendulum to its rest position and being operatively connected to said pendulum to effect an opening of said contacts upon displacement of said pendulum on acceleration.

4. A vehicle stop signal device comprising, an electric switch mechanism adapted for mounting on a movable vehicle subject to acceleration and deceleration and comprising, first and second sets of electric contacts normally maintained in open position, a pendulum mounted to swing in a plane parallel to the direction of movement of said vehicle and having a normal rest position and mounted for movement therefrom in response to change in velocity of said vehicle and operatively connected to said contacts and being displaced from said rest position by a first distance upon a predetermined amount of deceleration to close said first set of contacts and being displaced by a second greater distance upon a greater amount of deceleration to close said second set of contacts, means functioning after closing of said second set of contacts to retain said second set of contacts in closed position upon return of said pendulum to its rest position and being operatively connected to said pendulum to effect an opening of said second set of contacts upon acceleration, said pendulum effecting an opening of said first set of contacts in response to an amount of deceleration less than predetermined amount.

5. In a vehicle stop signal device, an inertia switch adapted for indicating the deceleration of a vehicle comprising, a pendulum to be mounted on said vehicle to swing in a plane parallel to the direction of movement of said vehicle, a first electric contact carried by and movable with said pendulum, a second electric contact mounted for engagement with said first contact upon displacement of said pendulum in one direction by a first distance from its rest point, a movable member having a lost motion connection to said pendulum, a third electric contact carried by said member, a fourth electric contact mounted in the path of movement of said member for engagement with said first electric contact carried thereby, said lost motion connection effecting an engagement of said third and fourth named contacts upon displacement of said pendulum in said direction by a second distance from its rest point greater than said first distance and permitting a return of said pendulum to its rest point without disengaging said third and fourth named contacts, said lost motion connection effecting a disengagement of said third and fourth contacts upon displacement of said pendulum away from its rest point in an opposite direction.

6. In a vehicle stop signal an electric switch mechanism of the character described comprising, a pendulum mounted to swing to opposite sides of its rest position in response to a deceleration and an acceleration respectively of the mechanism, an electric switch contact carried by said pendulum, a second electric switch contact mounted for engagement by said first contact upon a predetermined amount of deceleration, a second pair of electric switch contacts, means having a lost motion connection to said pendulum and operative to close said second pair of contacts upon a predetermined amount of deceleration greater than said first amount and retaining said second pair of contacts in closed position upon return of said pendulum to rest position, said means and lost motion connection effecting an opening of said second pair of contacts upon acceleration of said mechanism.

7. In a vehicle stop signal device, an electric switch mechanism adapted for mounting on a movable support subject to acceleration and deceleration comprising, a pendulum mounted to swing to opposite sides of its rest position in a plane parallel to the direction of movement of the vehicle in response to deceleration and acceleration of said vehicle, an electric switch contact carried by said pendulum, a plurality of stationary electric switch contacts mounted in the path of movement of said first contact and successively engageable therewith upon predetermined amounts of deceleration, a second set of electric contacts, means having a lost motion connection to said pendulum and operated thereby upon an amount of deceleration greater than the aforesaid amounts to close said second contacts and operative to retain said second set of contacts in closed position upon return of said pendulum to its rest position, said lost motion connection operating to displace said means to open said second set of contacts upon movement of said pendulum in response to acceleration.

JOHN DEZZANI.

REFERENCES CITED

The following references are of record in the file of this patent:

UNITED STATES PATENTS

| Number | Name | Date |
|---|---|---|
| 383,889 | Johnston | June 5, 1888 |
| 817,719 | Leonard | Apr. 10, 1906 |
| 878,423 | Raynes | Feb. 4, 1908 |
| 1,149,453 | Landon | Aug. 10, 1915 |
| 1,835,894 | Olson | Dec. 8, 1931 |
| 2,216,364 | Dezzani | Oct. 1, 1940 |
| 2,263,230 | Young | Nov. 18, 1941 |

FOREIGN PATENTS

| Number | Country | Date |
|---|---|---|
| 322,914 | Great Britain | Dec. 19, 1929 |

OTHER REFERENCES

Publication—Electrical World, vol. 81, No. 13, page 754. (A copy of this publication may be found in Div. 42.)